(12) United States Patent
Wei et al.

(10) Patent No.: US 12,361,215 B2
(45) Date of Patent: Jul. 15, 2025

(54) PERFORMING MACHINE LEARNING TASKS USING INSTRUCTION-TUNED NEURAL NETWORKS

(71) Applicant: Google LLC, Mountain View, CA (US)

(72) Inventors: Jason Weng Wei, Mountain View, CA (US); Maarten Paul Bosma, Mountain View, CA (US); Yuzhe Zhao, Jr., San Francisco, CA (US); Kelvin Gu, Mountain View, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 679 days.

(21) Appl. No.: 17/561,581

(22) Filed: Dec. 23, 2021

(65) Prior Publication Data

US 2023/0205994 A1 Jun. 29, 2023

(51) Int. Cl.
*G06F 40/284* (2020.01)
*G06F 40/30* (2020.01)

(52) U.S. Cl.
CPC ............ *G06F 40/284* (2020.01); *G06F 40/30* (2020.01)

(58) Field of Classification Search
CPC ...... G06F 18/2113; G06F 40/44; G06F 40/56; G06F 40/58; G06F 40/40; G06F 40/30; G06F 40/284; G06F 16/3329; G06F 16/3344; G06F 16/338; G06F 40/289; G06F 40/47; G06F 40/126; G06F 40/216; G06F 40/35; G06F 11/3604; G06F 11/3664; G06F 16/953; G06F 18/214; G06F 18/24765; G06F 40/20; G06F 40/237; G06F 8/33; G10L 15/16; G10L 13/00; G10L 15/02;
(Continued)

(56) References Cited

U.S. PATENT DOCUMENTS 10,628,735 B2* 4/2020 Hermann .............. G06F 3/0484
11,594,212 B2* 2/2023 Sainath ................. G10L 15/063
(Continued)

OTHER PUBLICATIONS

Aghajanyan et al., "Muppet: Massive Multi-task Representations with Pre-Finetuning," arXiv, Jan. 26, 2021, 12 pages.
(Continued)

*Primary Examiner* — Abdelali Serrou
(74) *Attorney, Agent, or Firm* — Fish & Richardson P.C.

(57) ABSTRACT

Methods, systems, and apparatus, including computer programs encoded on a computer storage medium, for performing a machine learning task on an input to generate an output. In one aspect, one of the method includes receiving input data that describes an input of a machine learning task; receiving candidate output data that describes a set of candidate classification outputs of the machine learning task for the input; generating an input sequence that includes the input and the set of candidate classification outputs; processing the input sequence using a neural network to generate a network output that specifies a respective score for each candidate classification output in the set of candidate classification outputs; and generating an output of the machine learning task for the input, comprising selecting, as the output, a selected candidate classification output from the set of candidate classification outputs using the respective scores.

20 Claims, 6 Drawing Sheets

(58) Field of Classification Search
CPC ..... G10L 15/063; G10L 15/197; G10L 15/22; G10L 2015/025; G10L 2015/0633
See application file for complete search history.

(56) References Cited

U.S. PATENT DOCUMENTS

| | | | | |
|---|---|---|---|---|
| 11,694,677 | B2* | 7/2023 | Lee | G10L 15/183 704/232 |
| 2018/0114108 | A1* | 4/2018 | Lao | G06F 16/353 |
| 2020/0151544 | A1* | 5/2020 | Chiu | G06N 3/044 |
| 2020/0356625 | A1* | 11/2020 | Tater | G06F 40/226 |

OTHER PUBLICATIONS

Arivazhagan et al., "Massively Multilingual Neural Machine Translation in the Wild: Findings and Challenges," arXiv, Jul. 11, 2019, 27 pages.
Austin et al., "Program Synthesis with Large Language Models," arXiv, Aug. 16, 2021, 34 pages.
Axelrod et al., "Domain adaptation via pseudo in-domain data selection," Proceedings of the 2011 Conference on Empirical Methods in Natural Language Processing, Jul. 2011, pp. 355-362.
Banon et al., "ParaCrawl: Web-Scale Acquisition of Parallel Corpora," Proceedings of the 58th Annual Meeting of the Association for Computational Linguistics, Jul. 2020, pp. 4555-4567.
Bar-Haim et al., "The Second PASCAL Recognising Textual Entailment Challenge," Proceedings of the Second PASCAL Challenges Workshop on Recognising Textual Entailment, 2006, 9 pages.
Bender et al., "Climbing towards NLU: On Meaning, Form, and Understanding in the Age of Data," Proceedings of the 58th Annual Meeting of the Association for Computational Linguistics, Jul. 2020, pp. 5185-5198.
Bender et al., "On the Dangers of Stochastic Parrots: Can Language Models Be Too Big?" Proceedings of the 2021 ACM Conference on Fairness, Accountability, and Transparency, Mar. 2021, pp. 610-623.
Bentivogli et al., "The Fifth PASCAL Recognizing Textual Entailment Challenge," Presented at Text Analysis Conference (TAC), Gaithersburg, Maryland, USA, Nov. 16-17, 2009, 15 pages.
Bisk et al., "PIQA: Reasoning about Physical Commonsense in Natural Language," Thirty-Fourth AAAI Conference on Artificial Intelligence, Apr. 3, 2020, 8 pages.
Bojar et al., "Proceedings of the First Conference on Machine Translation: vol. 1," Presented at The 54th Annual Meeting of the Association for Computational Linguistics, Berlin, Germany, Aug. 7-12, 2016, 28 pages.
Bojar et al., "Proceedings of the Ninth Workshop on Statistical Machine Translation," Association for Computational Linguistics, Jun. 2014, 20 pages.
Bommasani et al., "On the Opportunities and Risks of Foundation Models," arXiv, Jul. 12, 2022, 214 pages.
Bowman et al., "A large annotated corpus for learning natural language inference," Proceedings of the 2015 Conference on Empirical Methods in Natural Language Processing, Sep. 2015, pp. 632-642.
Brown et al., "Language Models are Few-Shot Learners," Advances in Neural Information Processing Systems, Dec. 2020, 25 pages.
Chai et al., "Description Based Text Classification with Reinforcement Learning," Proceedings of the 37th International Conference on Machine Learning, Jul. 2020, 12 pages.
Chen et al., "Evaluating Large Language Models Trained on Code," arXiv, Jul. 14, 2021, 35 pages.
Choi et al., "QuAC: Question answering in context," Proceedings of the 2018 Conference on Empirical Methods in Natural Language Processing, Oct./Nov. 2018, pp. 2174-2184.
Clark et al., "BAM! Born-Again Multi-Task Networks for Natural Language Understanding," Proceedings of the 57th Annual Meeting of the Association for Computational Linguistics, Jul. 2019, pp. 5931-5937.
Clark et al., "BoolQ: Exploring the Surprising Difficulty of Natural Yes/No Questions," Proceedings of the 2019 Conference of the North American Chapter of the Association for Computational Linguistics: Human Language Technologies, vol. 1 (Long and Short Papers), Jun. 2019, pp. 2924-2936.
Clark et al., "Think you have Solved Question Answering? Try ARC, the AI2 Reasoning Challenge," arXiv, Mar. 14, 2018, 10 pages.
Collobert et al., "Natural language processing (almost) from scratch," Journal of Machine Learning Research, Aug. 2011, 45 pages.
Corazza et al., "Hybrid Emoji-Based Masked Language Models for Zero-Shot Abusive Language Detection," Findings of the Association for Computational Linguistics, Nov. 2020, pp. 943-949.
Dagan et al., "The PASCAL Recognising Textual Entailment Challenge," Proceedings of the First International Conference on Machine Learning Challenges: Evaluating Predictive Uncertainty Visual Object Classification, and Recognizing Textual Entailment, 2005, 14 pages.
Dai et al., "Semi-supervised Sequence Learning," Advances in Neural Information Processing Systems, Dec. 2015, 9 pages.
De Marneffe et al., "The CommitmentBank: Investigating projection in naturally occurring discourse," Proceedings of Sinn und Bedeutung, Jul. 25, 2019, 18 pages.
Devlin et al., "BERT: Pre-training of Deep Bidirectional Transformers for Language Understanding," arXiv, May 24, 2019, 16 pages.
Devlin et al., "BERT: Pre-training of deep bidirectional transformers for language understanding," Proceedings of the 2019 Conference of the North American Chapter of the Association for Computational Linguistics: Human Language Technologies, vol. 1 (Long and Short Papers), Jun. 2019, pp. 4171-4186.
Dolan et al., "Automatically Constructing a Corpus of Sentential Paraphrases," Proceedings of the Third International Workshop on Paraphrasing, Jan. 2005, 8 pages.
Dua et al., "DROP: A Reading Comprehension Benchmark Requiring Discrete Reasoning Over Paragraphs," Proceedings of the 2019 Conference of the North American Chapter of the Association for Computational Linguistics: Human Language Technologies, vol. 1 (Long and Short Papers), Jun. 2019, pp. 2368-2378.
Durrani et al., "Edinburgh's phrase-based machine translation systems for WMT-14," Proceedings of the Ninth Workshop on Statistical Machine Translation, Jun. 2014, pp. 97-104.
Dušek et al., "Semantic Noise Matters for Neural Natural Language Generation," Proceedings of the 12th International Conference on Natural Language Generation, Oct./Nov. 2019, pp. 421-426.
Edunov et al., "Understanding Back-Translation at Scale," Proceedings of the 2018 Conference on Empirical Methods in Natural Language Processing, Oct./Nov. 2018, pp. 489-500.
Efrat et al., "The Turking Test: Can Language Models Understand Instructions?" arXiv, Oct. 22, 2020, 12 pages.
Fabbri et al., "Multi-News: A Large-Scale Multi-Document Summarization Dataset and Abstractive Hierarchical Model," Proceedings of the 57th Annual Meeting of the Association for Computational Linguistics, Jul. 2019, pp. 1074-1084.
Fedus et al., "Switch Transformers: Scaling to Trillion Parameter Models with Simple and Efficient Sparsity," arXiv, Jan. 11, 2021, 40 pages.
Finn et al., "Model-Agnostic Meta-Learning for Fast Adaptation of Deep Networks," Proceedings of the 34th International Conference on Machine Learning, 2017, 10 pages.
Gao et al., "Making Pre-trained Language Models Better Few-shot Learners," Proceedings of the 59th Annual Meeting of the Association for Computational Linguistics and the 11th International Joint Conference on Natural Language Processing (vol. 1: Long Papers), Aug. 2021, pp. 3816-3830.
Gardent et al., "The WebNLG Challenge: Generating Text from RDF Data," Proceedings of the 10th International Conference on Natural Language Generation, Sep. 2017, pp. 124-133.
Gehrmann et al., "The GEM benchmark: Natural language generation, its evaluation and metrics," Proceedings of the 1st Workshop on Natural Language Generation, Evaluation, and Metrics (GEM 2021), Aug. 2021, pp. 96-120.
Giampiccolo et al., "The third PASCAL recognizing textual entailment challenge," Proceedings of the ACL-PASCAL Workshop on Textual Entailment and Paraphrasing, Jun. 2007, 9 pages.

(56) References Cited

OTHER PUBLICATIONS

Gliwa et al., "SAMSum Corpus: A Human-annotated Dialogue Dataset for Abstractive Summarization," Proceedings of the 2nd Workshop on New Frontiers in Summarization, Nov. 2019, pp. 70-79.
Go et al., "Twitter sentiment classification using distant supervision," CS224N project report, 2009, 6 pages.
Goldwasser et al., "Learning from natural instructions," Machine Learning, 2014, 94:205-232.
Grusky et al., "Newsroom: A Dataset of 1.3 Million Summaries with Diverse Extractive Strategies," Proceedings of the 2018 Conference of the North American Chapter of the Association for Computational Linguistics: Human Language Technologies, vol. 1 (Long Papers), Jun. 2018, pp. 708-719.
He et al., "Question-answer driven semantic role labeling: Using natural language to annotate natural language," Proceedings of the 2015 Conference on Empirical Methods in Natural Language Processing, Sep. 2015, pp. 643-653.
Hovy et al., "Toward semantics-based answer pinpointing," Proceedings of the First International Conference on Human Language Technology Research, 2001, 7 pages.
Howard et al., "Universal language model fine-tuning for text classification," Universal Language Model Fine-tuning for Text Classification, Jul. 2018, pp. 328-339.
Huang et al., "Cosmos QA: Machine Reading Comprehension with Contextual Commonsense Reasoning," Proceedings of the 2019 Conference on Empirical Methods in Natural Language Processing and the 9th International Joint Conference on Natural Language Processing (EMNLP-IJCNLP), Nov. 2019, pp. 2391-2401.
Johnson et al., "Google's Multilingual Neural Machine Translation System: Enabling Zero-Shot Translation," Transactions of the Association for Computational Linguistics, vol. 5, 2017, pp. 339-351.
Joshi et al., "TriviaQA: A Large Scale Distantly Supervised Challenge Dataset for Reading Comprehension," Proceedings of the 55th Annual Meeting of the Association for Computational Linguistics (vol. 1: Long Papers), Jul. 2017, pp. 1601-1611.
Khashabi et al., "Looking Beyond the Surface: A Challenge Set for Reading Comprehension over Multiple Sentences," Proceedings of the 2018 Conference of the North American Chapter of the Association for Computational Linguistics: Human Language Technologies, vol. 1 (Long Papers), Jun. 2018, pp. 252-262.
Kotzias et al., "From Group to Individual Labels Using Deep Features," Proceedings of the 21th ACM SIGKDD International Conference on Knowledge Discovery and Data Mining, Aug. 2015, pp. 597-606.
Kudo et al., "SentencePiece: A simple and language independent subword tokenizer and detokenizer for Neural Text Processing," Proceedings of the 2018 Conference on Empirical Methods in Natural Language Processing: System Demonstrations, Nov. 2018, pp. 66-71.
Kumar et al., "Ask Me Anything: Dynamic Memory Networks for Natural Language Processing," Proceedings of The 33rd International Conference on Machine Learning, 2016, 10 pages.
Kwiatkowski et al., "Natural Questions: A benchmark for question answering research," Transactions of the Association for Computational Linguistics, Aug. 2019, 7:453-466.
Ladhak et al., "WikiLingua: A New Benchmark Dataset for Cross-Lingual Abstractive Summarization," arXiv, Oct. 7, 2020, 15 pages.
Lampert et al., "Learning to detect unseen object classes by between-class attribute transfer," Presented at 2009 IEEE Conference on Computer Vision and Pattern Recognition, Miami, FL, USA, Jun. 20-25, 2009, pp. 951-958.
Lauscher et al., "From Zero to Hero: On the Limitations of Zero-Shot Language Transfer with Multilingual Transformers," Proceedings of the 2020 Conference on Empirical Methods in Natural Language Processing (EMNLP), Nov. 2020, pp. 4483-4499.
Lee et al., "Latent Retrieval for Weakly Supervised Open Domain Question Answering," Proceedings of the 57th Annual Meeting of the Association for Computational Linguistics, Jul. 2019, pp. 6086-6096.
Lepikhin et al., "Gshard: Scaling giant models with conditional computation and automatic sharding," Presented at Ninth International Conference on Learning Representations, Virtual Only, May 3-7, 2021, 23 pages.
Lester et al., "The Power of Scale for Parameter-Efficient Prompt Tuning," Proceedings of the 2021 Conference on Empirical Methods in Natural Language Processing, Nov. 2021, pp. 3045-3059.
Levesque et al., "The Winograd Schema Challenge," AAAI Publications, Thirteenth International Conference on the Principles of Knowledge Representation and Reasoning, May 17, 2012, 10 pages.
Levy et al., "Zero-Shot Relation Extraction via Reading Comprehension," Proceedings of the 21st Conference on Computational Natural Language Learning (CoNLL 2017), Aug. 2017, pp. 333-342.
Lewis et al., "BART: Denoising Sequence-to-Sequence Pre-training for Natural Language Generation, Translation, and Comprehension," Proceedings of the 58th Annual Meeting of the Association for Computational Linguistics, Jul. 2020, pp. 7871-7880.
Li et al., "A Unified MRC Framework for Named Entity Recognition," Proceedings of the 58th Annual Meeting of the Association for Computational Linguistics, Jul. 2020, pp. 5849-5895.
Li et al., "Learning Question Classifiers," COLING 2002: The 19th International Conference on Computational Linguistics, 2002, 7 pages.
Li et al., "Prefix-Tuning: Optimizing Continuous Prompts for Generation," Proceedings of the 59th Annual Meeting of the Association for Computational Linguistics and the 11th International Joint Conference on Natural Language Processing (vol. 1: Long Papers), Aug. 2021, pp. 4582-4597.
Lin et al., "CommonGen: A Constrained Text Generation Challenge for Generative Commonsense Reasoning," Findings of the Association for Computational Linguistics: EMNLP 2020, Nov. 2020, pp. 1823-1840.
Liu et al., "Multilingual denoising pre-training for neural machine translation," Transactions of the Association for Computational Linguistics, Nov. 2020, 8:726-742.
Liu et al., "Multi-Task Deep Neural Networks for Natural Language Understanding," Proceedings of the 57th Annual Meeting of the Association for Computational Linguistics, Jul. 2019, pp. 4487-4496.
Liu et al., "Pre-train, Prompt, and Predict: A Systematic Survey of Prompting Methods in Natural Language Processing," arXiv, Jul. 28, 2021, 46 pages.
Liu et al., "Reconstructing Capsule Networks for Zero-shot Intent Classification," Proceedings of the 2019 Conference on Empirical Methods in Natural Language Processing and the 9th International Joint Conference on Natural Language Processing (EMNLP-IJCNLP), Nov. 2019, pp. 4799-4809.
Luong et al., "Multi-task sequence to sequence learning," Presented at 4th International Conference on Learning Representations, ICLR 2016, San Juan, Puerto Rico, May 2-4, 2016, 10 pages.
Maas et al., "Learning word vectors for sentiment analysis," Proceedings of the 49th Annual Meeting of the Association for Computational Linguistics: Human Language Technologies, Jun. 2011, pp. 142-150.
McCann et al., "The Natural Language Decathlon: Multitask Learning as Question Answering," arXiv, Jun. 20, 2018, 23 pages.
McCarthy., "Programs with common sense," RLE and MIT computation center, 1960, 17 pages.
Mihaylov et al., "Can a Suit of Armor Conduct Electricity? A New Dataset for Open Book Question Answering," Proceedings of the 2018 Conference on Empirical Methods in Natural Language Processing, Oct./Nov. 2018, pp. 2381-2391.
Mishra et al., "Natural Instructions: Benchmarking Generalization to New Tasks from Natural Language Instructions," arXiv, Apr. 18, 2021, 18 pages.
Mostafazadeh et al., "A corpus and cloze evaluation for deeper understanding of commonsense stories," Proceedings of the 2016 Conference of the North American Chapter of the Association for Computational Linguistics: Human Language Technologies, Jun. 2016, pp. 839-849.
Nan et al., "DART: Open-Domain Structured Data Record to Text Generation," Proceedings of the 2021 Conference of the North

(56) References Cited

OTHER PUBLICATIONS

American Chapter of the Association for Computational Linguistics: Human Language Technologies, Jun. 2021, pp. 432-447.

Napoles et al., "Annotated Gigaword," Proceedings of the Joint Workshop on Automatic Knowledge Base Construction and Web-scale Knowledge Extraction (AKBC-WEKEX), Jun. 2012, 6 pages.

Narayan et al., "Don't Give Me the Details, Just the Summary! Topic-Aware Convolutional Neural Networks for Extreme Summarization," Proceedings of the 2018 Conference on Empirical Methods in Natural Language Processing, Oct./Nov. 2018, pp. 1797-1807.

Nie et al., "Adversarial NLI: A New Benchmark for Natural Language Understanding," Proceedings of the 58th Annual Meeting of the Association for Computational Linguistics, Jul. 2020, pp. 4885-4901.

Peters et al., "Deep contextualized word representations," Proceedings of the 2018 Conference of the North American Chapter of the Association for Computational Linguistics: Human Language Technologies, vol. 1 (Long Papers), Jun. 2018, pp. 2227-2237.

Pham et al., "Improving Zero-shot Translation with Language-Independent Constraints," Proceedings of the Fourth Conference on Machine Translation (vol. 1: Research Papers), Aug. 2019, pp. 13-23.

Pilehvar et al., "WiC: the Word-in-Context Dataset for Evaluating Context-Sensitive Meaning Representations," Proceedings of the 2019 Conference of the North American Chapter of the Association for Computational Linguistics: Human Language Technologies, vol. 1 (Long and Short Papers), Jun. 2019, pp. 1267-1273.

Pratap et al., "Massively Multilingual ASR: 50 Languages, 1 Model, 1 Billion Parameters," arXiv, Jul. 8, 2020, 5 pages.

Qin et al., "Learning how to ask: Querying LMs with mixtures of soft prompts," Proceedings of the 2021 Conference of the North American Chapter of the Association for Computational Linguistics: Human Language Technologies (NAACL-HLT), Jun. 2021, pp. 5203-5212.

Radford et al., "Improving language understanding by generative pre-training," Computer Science, 2018, 12 pages.

Radford et al., "Language models are unsupervised multitask learners," Computer Science, 2019, 24 pages.

Raffel et al, "Exploring the Limits of Transfer Learning with a Unified Text-to-Text Transformer" Journal of Machine Learning Research, Jun. 2020, 67 pages.

Rahman et al., "Resolving complex cases of definite pronouns: The Winograd schema challenge," Proceedings of the 2012 Joint Conference on Empirical Methods in Natural Language Processing and Computational Natural Language Learning, Jul. 2012, pp. 777-789.

Rajpurkar et al., "Know What You Don't Know: Unanswerable Questions for SQuAD," Proceedings of the 56th Annual Meeting of the Association for Computational Linguistics (vol. 2: Short Papers), Jul. 2018, pp. 784-789.

Rajpurkar et al., "SQuAD: 100,000+ Questions for Machine Comprehension of Text," Proceedings of the 2016 Conference on Empirical Methods in Natural Language Processing, Nov. 2016, pp. 2383-2392.

Reddy et al., "CoQA: A Conversational Question Answering Challenge," Transactions of the Association for Computational Linguistics, May 2019, 7:249-266.

Reif et al., "A Recipe For Arbitrary Text Style Transfer with Large Language Models," arXiv, Nov. 8, 2021, 12 pages.

Roemmele et al., "Choice of plausible alternatives: An evaluation of commonsense causal reasoning," Commonsense Reasoning, 2011, 6 pages.

Romera-Paredes et al., "An embarrassingly simple approach to zero-shot learning," Proceedings of the 32nd International Conference on Machine Learning, 2015, 10 pages.

Ruder, "An Overview of Multi-Task Learning in Deep Neural Networks," arXiv, Jun. 15, 2017, 14 pages.

Sakaguchi et al., "WinoGrande: An adversarial winograd schema challenge at scale," Proceedings of the AAAI Conference on Artificial Intelligence, 2020, 3 pages.

Saxton et al., "Analysing mathematical reasoning abilities of neural models," Proceedings of the International Conference on Learning Representations, 2019, 17 pages.

Schick et al., "Exploiting Cloze-Questions for Few-Shot Text Classification and Natural Language Inference," Proceedings of the 16th Conference of the European Chapter of the Association for Computational Linguistics: Main Volume, Apr. 2021, pp. 255-269.

See et al., "Get To The Point: Summarization with Pointer-Generator Networks," Proceedings of the 55th Annual Meeting of the Association for Computational Linguistics (vol. 1: Long Papers), Jul. 2017, pp. 1073-1083.

Sennrich et al., "Edinburgh Neural Machine Translation Systems for WMT 16," Proceedings of the First Conference on Machine Translation: vol. 2, Shared Task Papers, Aug. 2016, pp. 371-376.

Shazeer et al., "Adafactor: Adaptive Learning Rates with Sublinear Memory Cost," Proceedings of the 35th International Conference on Machine Learning, 2018, 9 pages.

Socher et al., "Recursive deep models for semantic compositionality over a sentiment treebank," Proceedings of the 2013 Conference on Empirical Methods in Natural Language Processing, Oct. 2013, pp. 1631-1642.

Solaiman et al., "Process for Adapting Language Models to Society (PALMS) with Values-Targeted Datasets," Advances in Neural Information Processing Systems, 2021, 13 pages.

Srivastava et al., "Zero-shot Learning of Classifiers from Natural Language Quantification," Proceedings of the 56th Annual Meeting of the Association for Computational Linguistics (vol. 1: Long Papers), Jul. 2018, pp. 306-316.

Tam et al., "Improving and Simplifying Pattern Exploiting Training," Proceedings of the 2021 Conference on Empirical Methods in Natural Language Processing, Nov. 2021, pp. 4980-4991.

Vanschoren, "Meta-learning: A survey," arXiv, Oct. 8, 2018, 29 pages.

Vaswani et al, "Attention is All you Need," Advances in Neural Information Processing Systems, 2017, 11 pages.

Velay et al., "Seq2Seq and Multi-Task Learning for joint intent and content extraction for domain specific interpreters," arXiv, Aug. 1, 2018, 6 pages.

Wang et al., "GLUE: A Multi-Task Benchmark and Analysis Platform for Natural Language Understanding," Proceedings of the 2018 EMNLP Workshop BlackboxNLP: Analyzing and Interpreting Neural Networks for NLP, Nov. 2018, pp. 353-355.

Wang et al., "Multi-agent dual learning," Proceedings of the International Conference on Learning Representations (ICLR), 2019, 15 pages.

Wang et al., "Neural network-based abstract generation for opinions and arguments," Proceedings of the 2016 Conference of the North American Chapter of the Association for Computational Linguistics: Human Language Technologies, Jun. 2016, pp. 47-57.

Wang et al., "SuperGLUE: A Stickier Benchmark for General-Purpose Language Understanding Systems," Advances in Neural Information Processing Systems, 2019, 15 pages.

Wang et al., "Towards Zero-Label Language Learning," arXiv, Sep. 19, 2021, 14 pages.

Warstadt et al., "Neural Network Acceptability Judgments," Transactions of the Association for Computational Linguistics, Sep. 2019, 7:625-641.

Williams et al., "A Broad-Coverage Challenge Corpus for Sentence Understanding through Inference," Proceedings of the 2018 Conference of the North American Chapter of the Association for Computational Linguistics: Human Language Technologies, vol. 1 (Long Papers), Jun. 2018, pp. 1112-1122.

Worsham et al., "Multi-task learning for natural language processing in the 2020s: Where are we going?" Pattern Recognition Letters, Aug. 2020, 12 pages.

Wu et al., "CorefQA: Coreference resolution as query-based span prediction," Proceedings of the 58th Annual Meeting of the Association for Computational Linguistics, Jul. 2020, pp. 6953-6963.

Wu et al., "Recursively Summarizing Books with Human Feedback," arXiv, Sep. 27, 2021, 37 pages.

(56) References Cited

OTHER PUBLICATIONS

Ye et al., "CrossFit: A Few-shot Learning Challenge for Cross-task Generalization in NLP," Proceedings of the 2021 Conference on Empirical Methods in Natural Language Processing, Nov. 2021, pp. 7163-7189.

Yin et al., "Benchmarking Zero-shot Text Classification: Datasets, Evaluation and Entailment Approach," Proceedings of the 2019 Conference on Empirical Methods in Natural Language Processing and the 9th International Joint Conference on Natural Language Processing (EMNLP-IJCNLP), Nov. 2019, pp. 3914-3923.

Zellers et al., "HellaSwag: Can a Machine Really Finish Your Sentence?" Proceedings of the 57th Annual Meeting of the Association for Computational Linguistics, Jul. 2019, pp. 4791-4800.

Zhang et al., "Character-level Convolutional Networks for Text Classification," Advances in Neural Information Processing Systems, 2015, 9 pages.

Zhang et al., "PAWS: Paraphrase Adversaries from Word Scrambling," Proceedings of the 2019 Conference of the North American Chapter of the Association for Computational Linguistics: Human Language Technologies, vol. 1 (Long and Short Papers), Jun. 2019, pp. 1298-1308.

Zhang et al., "ReCoRD: Bridging the Gap between Human and Machine Commonsense Reading Comprehension," arXiv, Oct. 30, 2018, 14 pages.

Zhang et al., "This email could save your life: Introducing the task of email subject line generation," Proceedings of the 57th Annual Meeting of the Association for Computational Linguistics, Jul./Aug. 2019, pp. 446-456.

Zhong et al., "Meta-tuning Language Models to Answer Prompts Better," arXiv, Apr. 17, 2021, 18 pages.

\* cited by examiner

PERFORMING MACHINE LEARNING TASKS USING INSTRUCTION-TUNED NEURAL NETWORKS

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input.

Particular embodiments of the subject matter described in this specification can be implemented so as to realize one or more of the following advantages.

Some of the techniques described in this specification can allow a neural network system to perform machine learning tasks, and particularly classification tasks that involve natural language processing, more effectively than existing, autoregressive neural network systems. In particular, by employing the pre-processing techniques to generate input sequences that themselves define respective spaces of possible outputs for the inputs included in the input sequences, the neural network system is able to generate more accurate classification outputs for different inputs, while additionally being able to do this in a more flexible manner, i.e., predict different classifications in different output spaces for a same input. That is, the same neural network can perform multiple different classification tasks by pre-processing the inputs to the neural network differently and without needing to re-train the neural network to perform each of the tasks.

Some of the techniques described in this specification can also improve the overall effectiveness in terms of required computational resources (e.g., in terms of processing cycles, memory, or both) for fine-tuning a pre-trained neural network to adapt the neural network to attain a satisfactory performance on any of a variety of inference machine learning tasks. For example, the neural network can be pre-trained on unlabeled training data which is publicly available or otherwise easily obtainable in massive volumes, and then fine-tuned across a wide range of downstream machine learning tasks by using relatively smaller labeled training datasets and a fine-tuning technique referred to as "instruction tuning," where each training input to be used in the fine-tuning of the neural network is first transformed to include a natural language description of a machine learning task associated with the training input.

By virtue of the instruction tuning of the system as described in this specification, the neural network, once trained and deployed, can generate outputs for an unseen, inference machine learning task that are not significantly less accurate than outputs generated by a machine learning model that has been specifically trained on the inference task, despite only having been trained on the range of downstream machine learning tasks that are different from the inference machine learning task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs a machine learning task on a network input to generate network output for the machine learning task.

Figure 1:
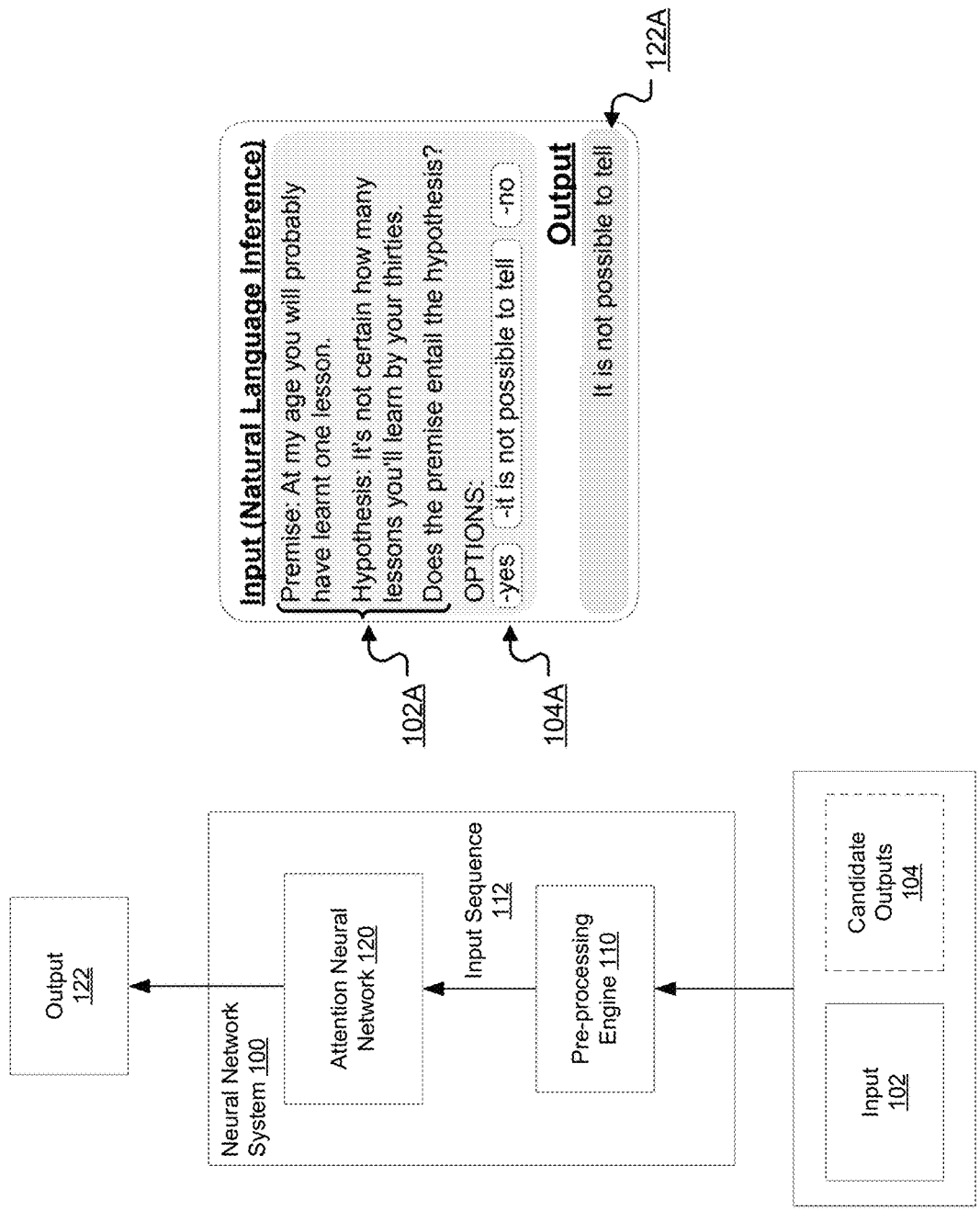
FIG. 1 shows an example neural network system for performing multiple different machine learning tasks.

FIG. 1 shows an example neural network system 100 for performing multiple different machine learning tasks. The neural network system 100 is an example of a system implemented as computer programs on one or more computers in one or more locations, in which the systems, components, and techniques described below can be implemented.

The neural network system 100 can receive an input 102 and perform each of the multiple machine learning tasks on the input 102 to generate an output 122.

The multiple machine learning tasks can include any of a variety of machine learning tasks that operate on a network input and generate a network output. In some cases, the network output can be a classification output or another standalone output. In other cases, the network output can be an output sequence. That is, some of the multiple different machine learning tasks that the system 100 is configurable to perform can include classification tasks, while others can include generative tasks that each require generating an output sequence.

Some examples of machine learning tasks that the system can be configured to perform follow. In particular, in some examples, the neural network system 100 can be configured to perform two or more of the following example tasks.

As one example, the machine learning task may be neural machine translation, where the input to the neural network is a sequence of text in one language and the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can be a classification of the spoken utterance into one of a plurality of categories, for example an identity of the natural language in which the utterance was spoken.

As another example, the task can be a natural language processing, inference, or understanding task that operates on a sequence of text in some natural language to generate an output. Example natural language processing, inference, or understanding tasks include an entailment task, a paraphrase task, a textual similarity task, a sentiment task, a sentence completion task, a grammaticality task, a commonsense task, a closed-book question answering task, a reading comprehension task, a reading comprehension with commonsense task, a coreference resolution task, a miscellaneous task, and the like, As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. Such electronic health data may, for example, comprise one or more sequences of physiological data taken from a patient, with the output being a corresponding prediction that relates to those sequences of data. Examples of physiological data and a corresponding prediction include: blood glucose measurements, with the prediction being a predicted future blood glucose measurement or the prediction of a hyper- or hypoglycemic event; a heart rate, with the prediction being the presence or absence of a heart condition, or a future cardiac event; blood pressure measurements, with the prediction being the risk of a future heart condition; or the like.

As another example, the task can be a text generation task, where the input is a sequence of text, and the output is another sequence of text, e.g., a completion of the input sequence of text, a response to a question posed in the input sequence, a sequence of text that is about a topic specified by the first sequence of text, or a summary of the input sequence. In the last example, the machine learning task may also be referred to as a summarization task, which aims at generating, from a corpus of text, a more condensed text description that encapsulates the most important information from the corpus of text. As another example, the input to the text generation task can be an input other than text, e.g., an input formatted as structured data, e.g., a table of data records or an image, and the output sequence can be text that describes the input.

As another example, the task can be an image generation task, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent. The observations may comprise sensor data captured by sensors associated with (e.g. part of) the agent, for example visual data, LIDAR data, sonar data, agent configuration data (e.g. joint angles), agent orientation data, or the like.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some of these examples where the inputs, the outputs, or both of the machine learning tasks may not be text, an embedding neural network that is configured to map the input to a numeric representation of the input in an embedding space, e.g., into a vector in the embedding space, a generative model that is configured to transform an embedded representation into an output having the desired format, or both can be used. For example, the system can use the embedding neural network to embed the non-text inputs into the same embedding space as used by the system to embed the text inputs, which are subsequently processed to generate the outputs of the task.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

To perform the machine learning task, the neural network system 100 includes an attention-based neural network (or, for short, "attention neural network") 120 that includes multiple attention layers. Each attention layer operates on a respective input sequence that includes a respective input vector at each of one or more positions.

The attention neural network 120 is a neural network that is configured to generate, at a given output time step, a score distribution of the next output to be included in the output sequence (i.e., the output at the given time step) conditioned on the past outputs that have already been generated (i.e., the outputs at time steps preceding the given time step). For example, the score distribution can be a discrete probability distribution over a predetermined vocabulary of the system 100. For example, the predetermined vocabulary may be a vocabulary of candidate outputs (referred to as "tokens") that is defined prior to the training of the system 100, or learned by the system 100 from the training process. The tokens can include any of a variety of possible language units, such as an alphabetical letter, a subword (i.e., a word piece), a word, a phrase, a number, a symbol, a punctuation, or the like.

Examples of configurations of attention neural networks and the specifics of the attention layers as well as other components of attention neural networks, e.g., embedding layers that embed inputs to the attention neural network, the feed-forward layers within the layers of the attention network, and the output layers of the attention neural network that generate the network outputs, are described in more detail in Vaswani, et al, *Attention Is All You Need*, arXiv: 1706.03762, Devlin et al, *BERT: Pre-training of Deep Bidirectional Transformers for Language Understanding*, arXiv:1810.04805, Raffel, et al, *Exploring the Limits of Transfer Learning with a Unified Text-to-Text Transformer*, arXiv:1910.10683, and Brown, et al, *Language Models are Few-Shot Learners*, arXiv:2005.14165, the entire contents of which are hereby incorporated by reference herein in their entirety.

As described above, some of the machine learning tasks that the system 100 can perform include classification tasks, where the system 100 is configured to process the input 102 and to generate as output 122 a predicted classification, e.g., a type, a class, a group, a category, or a condition, of the input. In the context of natural language processing, example classification tasks can include a natural language inference task, a sentiment task, a reading comprehension task, a commonsense reasoning task, a paraphrase task, a closed-book question answering task, and a coreference task.

For these classification tasks, some conventional systems may use a rank classification approach where, for each input, a respective score (e.g., a numerical probability or likelihood value) for each candidate classification output in a set of candidate classification outputs for the input are generated, and these systems then proceed to select the candidate classification output that has the highest score as the final predicted classification output. These systems, however, are typically not equipped to perceive any information relating to what candidate classifications are available, or desired, for a given classification task. As such, when performing the given classification task, these systems may generate respective scores for a set of candidate classification outputs that is different from a desired set of candidate classification outputs among which the final predicted classification output should be selected.

For example, multiple scores may be generated by these systems for different variations or alternatives of a same desired candidate classification output. In the example of a binary classification task where the output is one of the two candidate classifications, e.g., either "true" or "false," a large number of alternative representations for one particular classification may lower the score assigned to that particular classification, potentially resulting in these systems generating predicted classification outputs in a less accurate manner. That is, the system may generate a high score for "correct", which is semantically similar to "true," but which would not be considered when determining whether to assign the classification "true" or "false" to a given input.

By contrast, in addition to receiving the input 102, the system 100 is also configured to receive candidate output data that describes a set of candidate classification outputs 104 of the classification task for the input 102, and to pre-process the received input 102 and the set of candidate classification outputs 104 using a pre-processing engine 110 to generate an input sequence 112 that can be subsequently processed by the attention neural network 120. For example, the input 102, the set of candidate classification outputs 104, or both can be provided or otherwise specified by a user of the system, e.g., using an application programming interface (API) or a user interface (UI) made available by the system 100. As another example, the system 100 can receive an input from a user specifying which data that is already maintained or accessible by the system 100 should be used as the input 102, and then receive the set of candidate classification outputs 104 as an upload from the user.

In particular, the system 100 uses the pre-processing engine 110 to generate input sequences 112 in a manner that ensures that the attention neural network 120 can more effectively and accurately perform classification tasks.

The input sequence 112 includes one or more first tokens that separate the input data from the set of candidate classification outputs, and one or more second tokens that separate each candidate classification output in the set of candidate classification outputs from one another. The first or second token may be selected from the vocabulary of tokens that is defined prior to the training of the system which, when used as a delimiter item, can separate one informative fragment of an input sequence from another informative fragment of the input sequence.

In the example of FIG. 1, the neural network system 100 receives an input 102A that includes a premise, a hypothesis, and a natural language description of a natural language inference task. The system 100 also receives candidate output data 104A specifying a set of candidate classification outputs for the task. In this example, the system 100 generates, from the input 102A and the candidate output data 104A, an input sequence that uses a word ("OPTIONS") as the one or more first tokens to separate the input data 102A from the set of candidate classification outputs 104A, and uses a punctuation (hyphen) as the one or more second tokens to separate each candidate classification output in the set of candidate classification outputs 104A from one another. Here, the system 100 can use either a single token (in the cases where the vocabulary of the system includes words) or a concatenation of multiple tokens (in the cases where the vocabulary of the system includes alphabetical letters or subwords) as the delimiter item.

By processing the input sequence 112 generated by using the pre-processing techniques described in this specification, the attention neural network 120 can effectively identify the desired set of candidate classification outputs and, correspondingly, generate a network output that includes, at each output time step, a respective score for each token in a predetermined vocabulary of the system. Because each candidate classification output is composed of one or more tokens selected from the predetermined vocabulary, a respective score for each candidate classification output in the desired set of candidate classification outputs can subsequently be determined. Once the network output has been generated, the neural network system 100 can use the scores to generate the output 122, e.g., by selecting the candidate classification output with the highest score.

In the example of FIG. 1, the attention neural network 120 identifies a set of three candidate classification outputs ("yes", "it is not possible to tell", and "no") for the given natural language inference task by parsing the input sequence. The system 100 uses the attention neural network 120 to generate a network output from which a respective score for each candidate classification output can be determined, and then selects the candidate classification output ("it is not possible to tell") as the output 122A in response to the natural language description ("Does the premise entail the hypothesis?") included in the input 102A.

Figure 2:
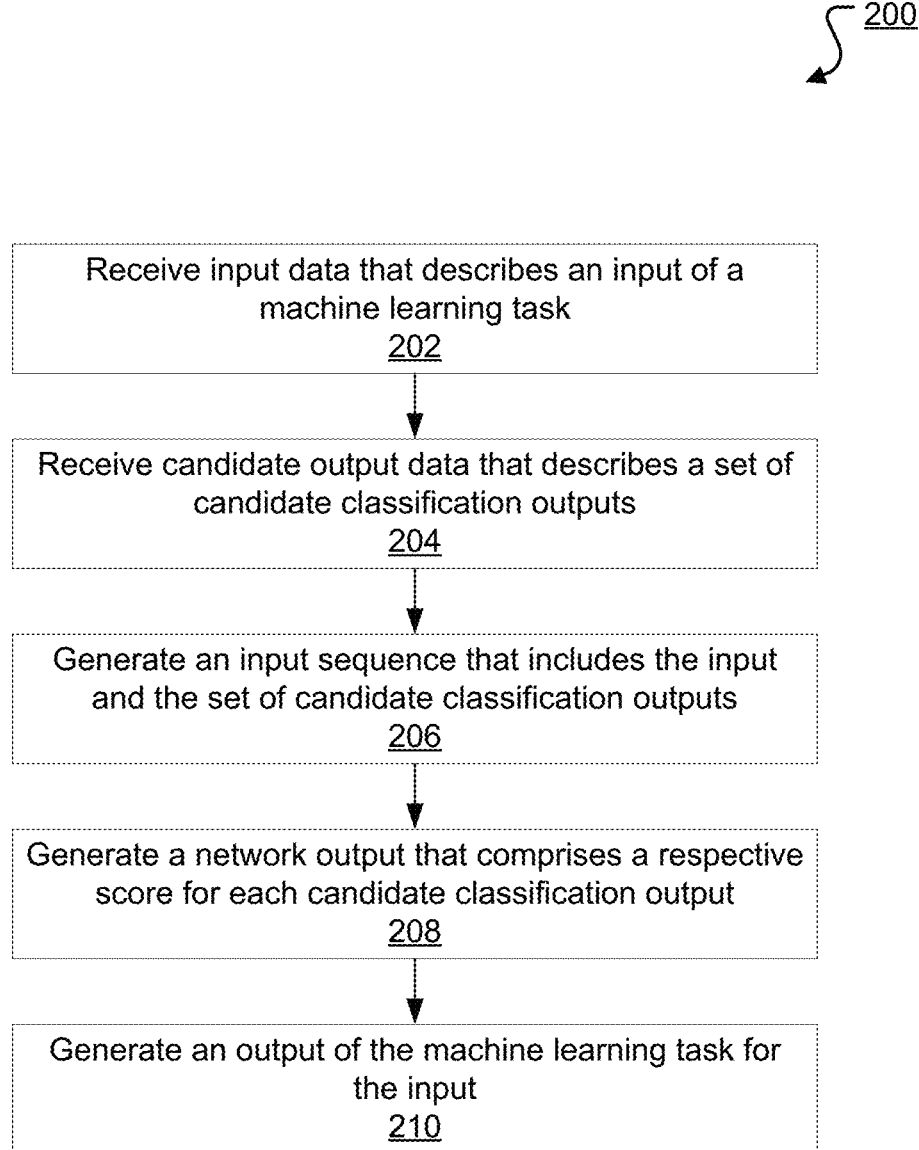
FIG. 2 is a flow diagram of an example process for performing a machine learning task on an input to generate an output.

FIG. 2 is a flow diagram of an example process 200 for performing a machine learning task on an input to generate an output. For convenience, the process 200 will be described as being performed by a system of one or more computers located in one or more locations. For example, a neural network system, e.g., neural network system 100 of FIG. 1, appropriately programmed in accordance with this specification, can perform the process 200.

The system receives input data that describes an input of a machine learning task (step 202). The machine learning task may be a classification task, e.g., a natural language inference task, a sentiment task, a reading comprehension task, a commonsense reasoning task, a paraphrase task, a closed-book question answering task, or a coreference task. The input may include a natural language description of the machine learning task. As shown in the example of FIG. 1, the natural language description may have an instructional format, i.e., may be a natural language instruction that describes the task.

The system receives candidate output data that describes a set of candidate classification outputs of the machine learning task for the input (step 204). For example, the candidate output data can be provided by a user of the system. The set of candidate classification outputs generally defines a space of possible outputs for the received input.

The system generates an input sequence that includes the input and the set of candidate classification outputs (step 206). The input sequence also includes one or more first tokens (i.e., as delimiters) that separate the input data from the set of candidate classification outputs, and one or more second tokens that separate each candidate classification output in the set of candidate classification outputs from one another. The second token may be the same as or different from the first token.

To generate the input sequence, the system can generate a concatenation of the input and the set of candidate classification outputs, with one or more first tokens inserted in between the input and the set of candidate classification outputs, as well as one or more second tokens inserted before each candidate classification output in the set of candidate classification outputs.

The system processes the input sequence using a neural network in accordance with current parameter values of the neural network to generate a network output (step 208). In some implementations, the neural network is an attention neural network configured to generate the network output in an auto-regressive manner. The network output auto-regressively generated by the attention neural network includes, at each output time step, a respective score for each token in the vocabulary of the system.

In particular, the network output specifies a respective score for each candidate classification output in the set of candidate classification outputs. Each candidate classification output may in turn be composed of one or more tokens in the vocabulary of the system. For example, as shown in FIG. 1, while the first candidate classification output includes a word "yes", which may correspond to a single vocabulary token, the second candidate classification output is made up of multiple words "it" "is" "not" "possible" "to" "tell", each of which may correspond to one or more different vocabulary tokens of the system. In the former case, the score generated by the neural network for the corresponding token at a first time step can be used as the score for the candidate classification output. In the latter case, for each candidate classification output, the scores generated by the neural network are auto-regressive with respect to the various tokens that make up the candidate classification output.

Thus, the system can generate, as part of the network output, a respective auto-regressive output for each candidate classification output which specifies the scores for the constituent tokens in the candidate classification output by, for each token, generating a score for the token that is conditioned on any tokens that have already been generated. In other words, the network output includes a respective auto-regressive output for each candidate classification output that, in turn, includes a respective score for each token in the candidate classification output. The system can generate the respective score for a given token in a candidate classification output by conditioning the neural network on the input sequence and any tokens before the given token in the candidate classification output to generate a score distribution over the tokens in the vocabulary and using the score for the given token in the score distribution as the score for the given token.

The score specified by the respective auto-regressive output for the each candidate classification output can be considered to be the product of the corresponding individual auto-regressive scores for the constituent tokens in the candidate classification output. In particular, to determine the score for a given candidate classification output the system can multiply the respective scores of the tokens one after the other at each time output time step according to an ordering of the constituent tokens in the given candidate classification output.

The system uses the network output to generate an output of the machine learning task for the input (step 210). As described above, the network output specifies a respective score for each candidate classification output in the set of candidate classification outputs. When used to generate the output of the machine learning task, the system can do this by selecting the candidate classification output with the highest score as the output of the machine learning task for the input. The system can also do this by sampling a candidate classification output in accordance with the respective scores that have been generated for the set of candidate classification outputs.

In some cases, in addition to the set of candidate classification outputs received at step 204, the system may receive another, different set of candidate classification outputs. For example, the different set of candidate classification outputs may be provided by another user of the system for the same input received at step 202. In this example, the machine learning task that the system should perform may or may not be the same as the machine learning task described in the input data received at step 202. In these cases, the system can generate another input sequence that includes the input and the different set of candidate classification outputs, and process the other input sequence using the neural network in accordance with the current parameter values of the neural network to generate another network output that specifies a respective score for each candidate classification output in the different set of candidate classification outputs. To generate another output for the same input received at step 202, the system can select, as the other output, a selected candidate classification output from the different set of candidate classification outputs (instead of from the set of candidate classification outputs received at step 204) using the respective scores. In particular, in these cases, both sets of classification outputs can be different from any set of classification outputs that has been used during the training of the system.

In some other cases, the input data received at step 202 may include a natural language instruction that describes a generative task, e.g., sequence generation task, including a structured data to text task, a translation task, a summarization task, and the like. In contrast to classification tasks in which an output must be selected from a given space of possible outputs, the output for a generative task may include novel information that does not appear in the input. In these cases, the system may receive no candidate output data, and instead proceed to generate and process an input sequence that does not include any candidate classification outputs using the neural network to generate a further network output that specifies a respective score for each candidate output in an entire vocabulary of candidate outputs (instead of in any set of candidate classification outputs). For example, the vocabulary may be a vocabulary of tokens that is learned by the system from the pre-training process. To generate the output sequence for the generative task, the system can iteratively generate a respective token at each output position of the output sequence by selecting a selected candidate output from the vocabulary of candidate outputs that has a highest score.

In general, the process 200 can be performed as part of predicting an output for an input for which the desired output, i.e., the output that should be generated by the system for the input, is not known.

The part of the process 200 that relates to input data pre-processing (including steps 202-206) can also be performed as part of processing inputs derived from a set of training data, i.e., inputs derived from a set of inputs for which the output that should be generated by the system is known, in order to train the attention neural network to determine trained values for the parameters of the attention neural network, so that the system can more effectively and accurately perform the machine learning task on the input.

The system (or another training system) can repeatedly perform these steps 202-206 on inputs selected from a set of training data as part of a conventional machine learning training technique to train the attention neural network, e.g., a gradient descent with backpropagation training technique that uses a conventional optimizer, e.g., stochastic gradient descent, RMSprop, Adafactor, or Adam optimizer, including Adam with weight decay ("AdamW") optimizer. During training, the system can incorporate any number of techniques to improve the speed, the effectiveness, or both of the training process. For example, the system can use examples—proportional mixing scheme to balance the different sizes of training datasets. As another example, the system can use packing to combine multiple training inputs into a single sequence, separating inputs from target outputs using a special EOS token. As another example, the system can perform the training using a distributed architecture that trains multiple instances of the attention neural network in parallel.

As a particular example, in some implementations, the training of the system can be performed in a two-stage process. During the initial pre-training stage, the system is broadly trained on a massive amount of unlabeled training data and by using unsupervised, self-supervised, and/or semi-supervised learning training technique(s). Next, during the subsequent fine-tuning stage, the system is fine-tuned on respective sets of labeled training inputs for different machine learning tasks. In particular, in some of these implementation, the fine-tuning stage of the system can be referred to as "instruction fine-tuning," or "instruction tuning" for short, where the system is trained on labeled training inputs that each include a natural language description of an associated task. This will be described in more detail below.

Figure 3:
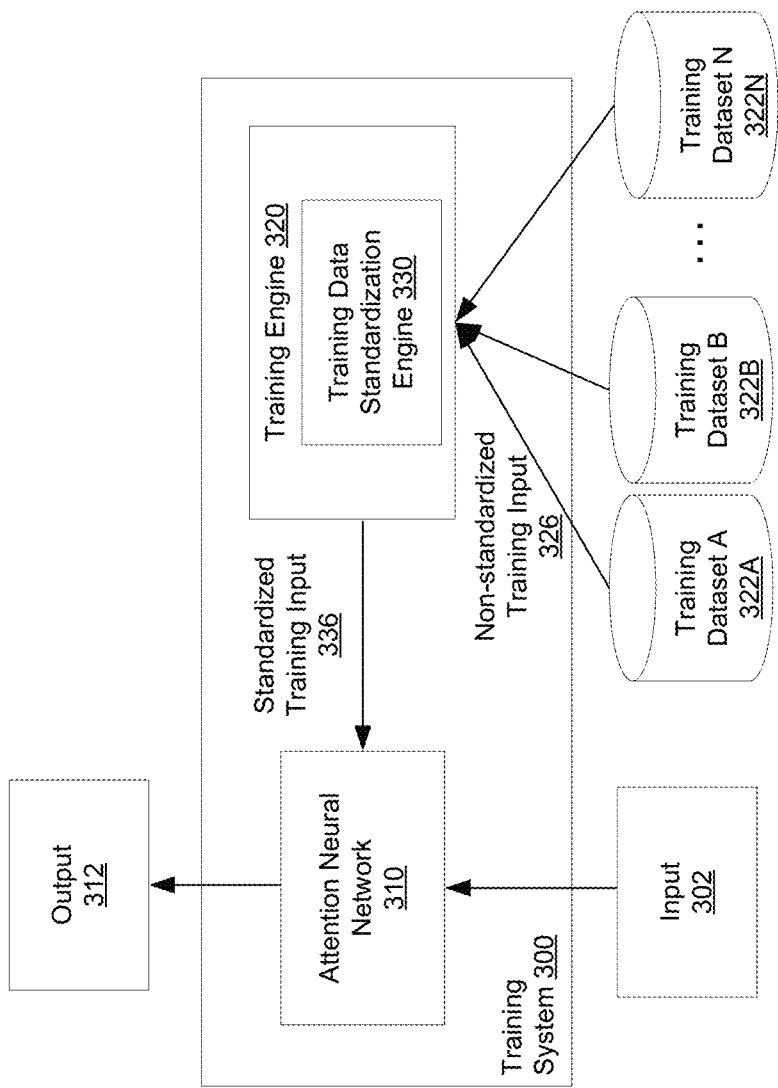
FIG. 3 shows an example training system.

FIG. 3 shows an example training system 300. The training system 300 is an example of a system implemented as computer programs on one or more computers in one or more locations, in which the systems, components, and techniques described below are implemented.

The training system 300 includes an attention neural network 310 and a training engine 320. The attention neural network 310 can receive an input 302 and generate an output 312 based on the input 302 and on values of the parameters of the attention neural network 310. The attention neural network 310 can have an appropriate neural network architecture that is described above with reference to FIG. 1.

The training engine 320 in the system 300 trains the attention neural network 310 to determine trained values of the network parameters from initial values of the network parameters using an iterative training process. At each iteration of the training process, the training engine 320 determines a parameter value update to the current network parameter values and then applies the update to the current network parameter values.

To perform the two-stage training process, the system 300 can use the training engine 320 to train the attention neural network 310 on unlabeled training data by using unsupervised, self-supervised, and/or semi-supervised learning training technique(s) to determine the pre-trained values of the network parameters. Instead of locally performing pre-training, the system 300 can also instantiate the attention neural network 310 based on another, already pre-trained model. That is, the system can initialize (a portion of) the parameters of the attention neural network 310 in accordance with known values of parameters of the other, pre-trained neural network. Example pre-training techniques as well as associated, pre-trained models are described in Devlin et al, *BERT: Pre-training of Deep Bidirectional Transformers for Language Understanding*, arXiv: 1810.04805, and Raffel, et al, *Exploring the Limits of Transfer Learning with a Unified Text-to-Text Transformer*, arXiv:1910.10683, the entire contents of which are hereby incorporated by reference herein in their entirety.

One of the fundamental limitations of fine-tuning a pre-trained attention neural network 310 to adapt it to an inference machine learning task (also referred to as a downstream task) is that fine-tuning the attention neural network 310 to generate high-quality outputs for the inference task typically requires large, labeled training datasets. A labeled training dataset includes training inputs and corresponding target training outputs associated with the training inputs. In addition, fine-tuning the attention neural network 310 to different inference tasks usually requires different training datasets, along with stored parameter values for each inference task. When billions or trillions of model parameters are considered, the cost associated with the fine-tuning training process, as well as data storage required for maintaining these model parameters can be significant.

Thus, to improve the effectiveness of the fine-tuning and to preclude the need of storing the respective sets of the model parameters for various inference tasks, the training engine 320 trains the attention neural network 310 using an instruction tuning technique. By virtue of the instruction tuning of the system as described in this specification, the attention neural network 310, once trained and deployed, can generate outputs for an inference machine learning task that are not significantly less accurate than outputs generated by a machine learning model that has been specifically trained on the inference task, despite only having been trained on the distinct machine learning tasks that are different from the inference machine learning task.

To perform instruction tuning, the training engine 320 uses a training data standardization engine 330 to convert the training inputs, e.g., training input 326, from a plurality of training datasets 322A-N for distinct machine learning tasks into a standardized format before the training inputs are used to train the attention neural network 310. The training inputs from the plurality of training datasets may have various, non-standardized formats. For example, the training inputs may be unlabeled, may have a different ordering of their contents, or may not themselves make clear what machine learning task(s) should be performed on the training inputs—rather, the task is defined by the way the neural network is configured and trained, e.g., through the choice of the formality of the network output and the training objective function. On the other hand, the standardized format is an instructional format that uses natural language instructions to describe the distinct machine learning tasks associated with the plurality of training datasets.

In particular, each training input, e.g., training input 336, once processed by the training data standardization engine 330 to have the standardized format, includes (i) a network input for a machine learning task that is derived from informative fragments of the original content of the training input, as well as (ii) a natural language description for the task, e.g., a sentence, a clause, or another multi-word phrase that specifies the task that the network should perform on the received input. In the cases of the task being a classification task, the natural language description also includes data specifying a set of candidate network outputs (i.e., candidate classification outputs) for the network input. The candidate network outputs generally defines a space of possible outputs for the network input.

The training engine 320 trains the attention neural network 310 on the standardized training inputs 336. Once the instruction tuning process has completed, the training system 300 can provide data specifying the trained attention neural network 310, e.g., the trained values of the parameters of the attention neural network and data specifying the architecture of the attention neural network, to another system, e.g., the neural network system 100 of FIG. 1, for use in processing new inputs for the machine learning task. Instead of or in addition to providing the data specifying the trained network, the system 300 can use the trained attention neural network 310 to process new inputs 302 to perform an inference machine learning task and generate respective outputs 312.

Figure 4:
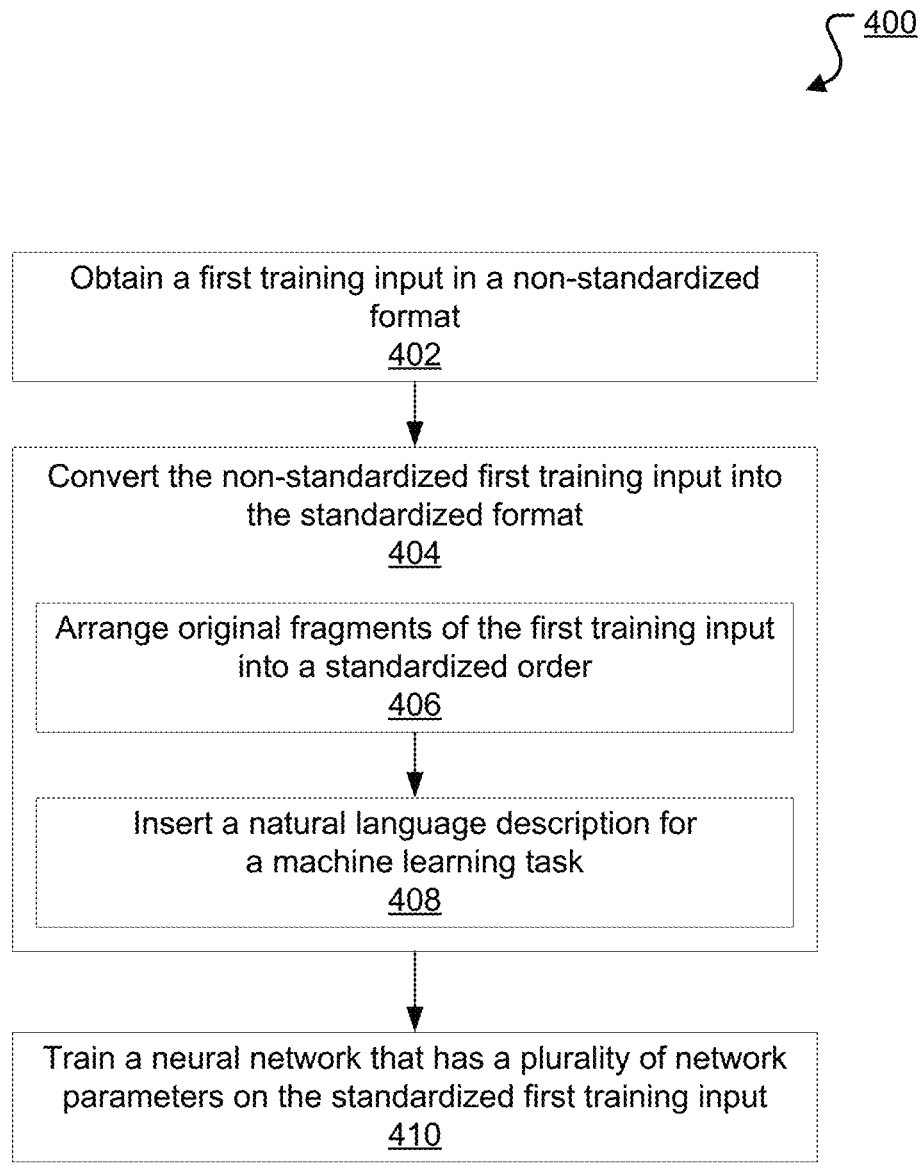
FIG. 4 is a flow diagram of an example process for training a neural network using training data standardization techniques.

FIG. 4 is a flow diagram of an example process 400 for training a neural network using training data standardization techniques. For convenience, the process 400 will be described as being performed by a system of one or more computers located in one or more locations. For example, a system, e.g., the training system 300 of FIG. 3, appropriately programmed in accordance with this specification, can perform the process 400.

The system maintains one or more training datasets for each of a plurality of distinct machine learning tasks. In general, the plurality of distinct machine learning tasks can be any of a variety of machine learning tasks that the attention neural network 310 of FIG. 3 is configurable to perform. In context of natural language processing, the plurality of tasks can include two or more of: a natural language inference task, a commonsense task, a sentiment task, a paraphrase task, a closed-book question answering task, a reading comprehension task, a reading comprehension with commonsense task, a coreference task, a miscellaneous task, a structured data to text task, a translation task, or a summarization task.

For each training dataset, the system also maintains one or more predetermined conversion templates that are used to facilitate the standardization processing of the training inputs obtained from the training dataset before the training inputs are used to train the neural network. In some implementations, the predetermined conversion templates are specific to each training dataset (or each machine learning task), and the system maintains different conversion templates for different training datasets (or different machine learning tasks).

In general, the system can repeatedly perform the following steps 402-410 for each training input from each of the plurality of training datasets.

The system obtains a first training input in a non-standardized format from a first training dataset of a plurality of training datasets for distinct machine learning tasks (step 402). The first training dataset includes a plurality of training inputs in the non-standardized format that is different from a standardized format of an inference input for an inference machine learning task. The first training input from the first training dataset may have any of a variety of non-standardized formats. For example, the first training input may be unlabeled, may have a different ordering of their contents, or may not itself make clear what machine learning task(s) should be performed on the first training input.

By contrast, the standardized format of the inference input is an instructional format that uses natural language instructions, e.g., a sentence, a clause, or another multi-word phrase, to describe the inference machine learning task. For example, as shown in FIG. 1, the inference input can have a standardized format which includes a natural language description ("Does the premise entail the hypothesis?") of the natural language inference task that is neural network should perform based on processing the network input which includes a premise, and a hypothesis. The natural language description also specifies a set of candidate outputs for the network input. Notably, the machine learning inference task may be different from any of the distinct machine learning tasks.

The system converts the non-standardized first training input into the standardized format in accordance with one or more predetermined conversion templates (step 404). The one or more predetermined conversion templates may be specific to the first training dataset and may be different from predetermined conversion templates for other training datasets in the plurality of training datasets. The standardized format is an instructional format (i.e., similar to the format of the inference input for the inference machine learning task) that uses natural language instructions, e.g., a sentence, a clause, or another multi-word phrase, to describe the different machine learning tasks for the plurality of training datasets.

In the implementations where the system maintains multiple conversion templates for each training dataset, the system can first select a selected predetermined conversion template from the multiple conversion templates according to a predetermined standardization scheme, e.g., through random sampling, and then use the selected conversion template to convert the non-standardized first training input into the standardized format.

In more detail, the conversion involves arranging the original fragments of the first training input into a standardized order (step 406), and inserting a natural language description for the machine learning task that the neural network should perform based on processing the first training input (step 408).

Figure 5:
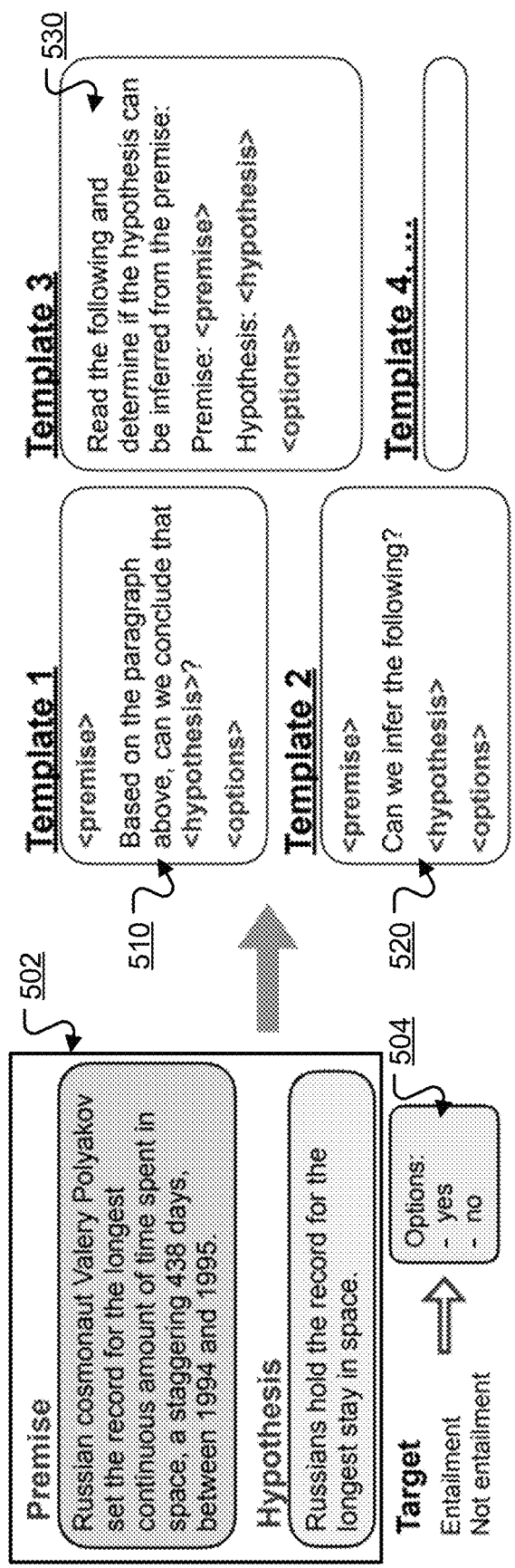
FIG. 5 is an example illustration of a first training input for a machine learning task in a non-standardized format and different conversion templates that can be used to convert the non-standardized first training input into a standardized format.

FIG. 5 is an example illustration of a first training input for a machine learning task in a non-standardized format and different conversion templates that can be used to convert the non-standardized first training input into a standardized format.

As depicted, the first training input 502 can be an input for a machine learning task (a natural language inference task) that includes a premise and a hypothesis. To perform the natural language inference task, the neural network processes the first training input 502 to generate an output that specifies whether or not the premise entails the hypothesis. The first training input 502 itself does not contain any information relating to for what task it may be used to train the neural network. Nor does the first training input 502 itself contain any information relating to what candidate classifications are available, or desired, for the task.

The system can use any one of the three example templates 510, 520, or 530 to convert the first training input 502 to have the standardized format. At step 406, the system can use the example conversion template to arrange (i.e., reorder) the original, informative fragments of the first training input 502 into a standardized order that is usually different from the original order of these fragments in the first training input 502. At step 408, the system can use the example conversion template to insert, as one or more additional fragments of the first training input, a respective natural language description (e.g., in the form of an instruction) for a machine learning task that the neural network should perform based on processing the first training input. In addition, the natural language description for the machine learning task optionally includes data that describes a set of candidate outputs 504 for the first training input, i.e., includes data specifying what possible outputs should be generated by the neural network based on processing the first training input.

In some cases, the machine learning task being described by the addition fragment(s) can be the original machine learning task associated with the first training dataset. For example, as depicted, the system can use the first example conversion template 510 to transform the first training input 502 to have a standardized format that begins with the premise (originally defined in the first training input), followed by the natural language instruction (generated by the system from the conversion template), the hypothesis (originally defined in the first training input), and ends with a list of candidate outputs (generated by the system from the conversion template). Each such fragment of the standardized first training input—i.e., the premise, the instruction, the hypothesis, or each candidate output in the list of candidate outputs—can be separated from one another by one or more delimiter tokens.

In other cases, instead of inserting the natural language description for the original task, the system can generate and insert, i.e., by using a different conversion template, a natural language description for another machine learning task that is different from the original machine learning task. This increases the diversity of the training. For example, the system can use a conversion template to generate and insert a natural language description of a generative task into a training input that is in fact obtained from a training dataset associated with a sentiment classification task.

Figure 6:
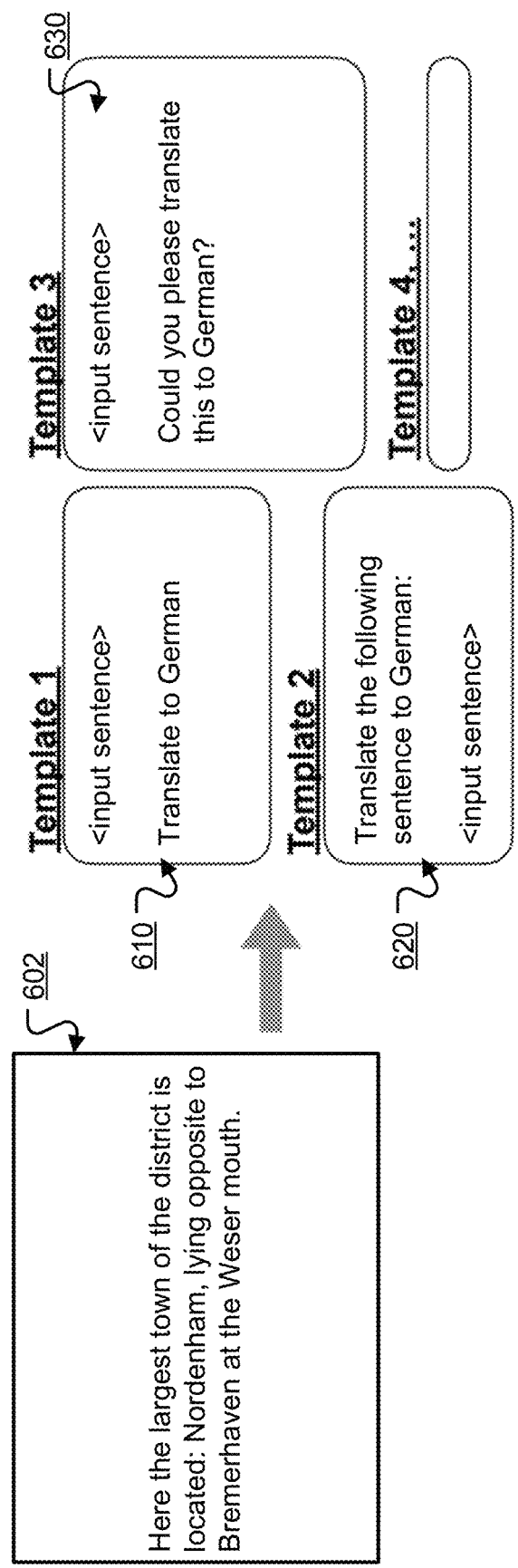
FIG. 6 is another example illustration of a first training input for a machine learning task in a non-standardized format and different conversion templates that can be used to convert the non-standardized first training input into a standardized format.

In yet other cases, the machine learning task can be a generative task, where the standardized first training input does not contain any candidate outputs. FIG. 6 is another example illustration of a first training input for a machine learning task in a non-standardized format and different conversion templates that can be used to convert the non-standardized first training input into a standardized format. In the example of FIG. 6, the machine learning task is a generative task (a translation task).

In these cases, as illustrated, the system can use any one of the three example templates 610, 620, or 630 to insert, as one or more additional fragments of the first training input, a respective natural language description (e.g., in the form of an instruction) for a machine learning task that the neural network should perform based on processing the first training input. The system can also use the template to arrange the original input sequence and the natural language description to have a standardized order. Notably, for generative tasks such as translation tasks, no candidate outputs need to be defined in the standardized first training input.

The system trains a neural network that has a plurality of network parameters on the standardized first training input (step 410). As will be described in more detail below, the training process involves determining trained parameter values of the neural network, e.g., from pre-trained parameter values, based on optimizing a fine-tuning objective function.

Specifically, the system can do this by processing, using the neural network and in accordance with current values of the plurality of network parameters, the standardized first training input to generate a first training output, and then evaluating a fine-tuning objective function that measures a quality of the first training output, e.g., that measures a difference between the first training output (or another output derived from the first training output) and a target training output associated with the first training input. The system then computes a gradient of the objective function with respect to the plurality of network parameters. As described above, the system can generate the first training output in an auto-regressive manner, and the first training output auto-regressively generated by the neural network includes, at each output time step, a respective training score for each token in the vocabulary of the system. From these training scores the training output for the machine learning task, e.g., a classification output or a generative output, can be determined.

In some examples, a cross-entropy loss function or a mean squared error (MSE) loss function can be used by the system as the fine-tuning objective function, e.g., in the case of classification tasks or regression tasks, respectively. In some of these examples, e.g., where the first training input includes a set of candidate classification outputs, teacher forcing can be utilized during training. In teacher forcing, training is conditioned on ground truth history which at inference time is replaced by network prediction. Feeding the ground truth output as the previous training output can help the neural network to learn quickly at the beginning to generate, at a given output time step, a high training score for a corresponding token that makes up the candidate classification output. In some other examples, in the cases of natural language processing tasks, the fine-tuning objective function can be a function that evaluates one or more of a bilingual evaluation understudy (BLEU) score, recall-oriented understudy for gisting evaluation (ROUGE) score, or perplexity.

The system then proceeds to update the current parameter values based on the gradient and by using a conventional machine learning training technique, e.g., a gradient descent with backpropagation training technique that uses a conventional optimizer, e.g., stochastic gradient descent, RMSprop, Adafactor, or Adam optimizer, including Adam with weight decay ("AdamW") optimizer. Alternatively, the system only proceeds to update the current parameter values once the steps 402-410 have been performed for an entire mini-batch of first training inputs. A mini-batch generally includes a fixed number of training inputs (e.g., 16, 64, or 256) or a fixed length of concatenated training inputs (e.g., 1024, 4096, or 8192 tokens). In other words, the system combines, e.g., by computing a weighted or unweighted average of, respective gradients that are determined during the fixed number of iterations of the steps 402-410 and proceeds to update the current parameter values based on the combined gradient.

The system can repeatedly perform the steps 402-410 until a fine-tuning training termination criterion is satisfied, e.g., after the steps 402-410 have been performed a predetermined number of times or after the gradient of the fine-tuning objective function has converged to a specified value.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    receiving, by the one or more computers, input data that describes an input of a first machine learning task;
    receiving, by the one or more computers, first candidate output data that includes tokens representing each candidate classification output in a first plurality of candidate classification outputs of the first machine learning task for the input;
    generating, by the one or more computers, an input sequence that includes the input and the first plurality of candidate classification outputs;
    processing, by the one or more computers, the input sequence using an auto-regressive neural network to generate a network output that specifies a respective score for each candidate classification output in the first plurality of candidate classification outputs;
    generating, by the one or more computers, a first output of the first machine learning task for the input, wherein generating the first output comprises using the respective scores specified by the network output generated by the auto-regressive neural network to select, as the first output, a selected candidate classification output from the first plurality of candidate classification outputs that are represented by the tokens included in the first candidate output data;
    receiving, by the one or more computers, input data that describes another input of a second machine learning task;
    receiving, by the one or more computers, second candidate output data that includes tokens representing each candidate classification output in a second plurality of candidate classification outputs of the second machine learning task for the other input, wherein the second plurality of candidate classification outputs comprise at least one different candidate classification output than the first plurality of candidate classification outputs;

generating, by the one or more computers, another input sequence that includes the other input and the second plurality of candidate classification outputs;

processing, by the one or more computers, the other input sequence using the auto-regressive neural network to generate another network output that specifies a respective score for each candidate classification output in the second plurality of candidate classification outputs; and generating, by the one or more computers, a second output of the second machine learning task for the other input, wherein generating the second output comprises using the respective scores specified by the other network output generated by the auto-regressive neural network to select, as the second output, a selected candidate classification output from the second plurality of candidate classification outputs that are represented by the tokens included in the second candidate output data.

2. The method of claim 1, wherein the network output comprises a respective auto-regressive output for each candidate classification output in the first plurality of candidate classification outputs, and wherein each respective auto-regressive output comprises, at each of one or more output time steps, a respective score for each candidate output token in a vocabulary of candidate output tokens.

3. The method of claim 2, wherein generating the first output of the machine learning task for the input comprises:
determining the respective score for each candidate classification output in the first plurality of candidate classification outputs from the auto-regressive output generated by the neural network for the candidate classification output.

4. The method of claim 3, wherein selecting, as the first output, the selected candidate classification output comprises:
selecting, from the first plurality of candidate classification outputs, the selected candidate classification output for which a highest score has been determined from the respective auto-regressive output.

5. The method of claim 1, wherein the input sequence comprises one or more first tokens that separate the input from the first plurality of candidate classification outputs.

6. The method of claim 1, wherein the input sequence comprises one or more second tokens that separate each candidate classification output in the first plurality of candidate classification outputs from one another.

7. The method of claim 1, wherein the first machine learning task and the second machine learning task are each a respective one of:
a natural language inference task, a sentiment task, a reading comprehension task, a commonsense reasoning task, a paraphrase task, a closed-book question answering task, or a coreference task.

8. The method of claim 1, wherein the auto-regressive-neural network is an attention-based neural network that has been pre-trained on unlabeled training data and subsequently fine-tuned on training inputs that each include a natural language description of an associated task.

9. The method of claim 1, further comprising:
receiving input data that describes a further input of another machine learning task that is a sequence generation task;

processing an input sequence that does not include any candidate classification outputs using the auto-regressive neural network to generate a further network output that comprises a respective score for each candidate output token in a vocabulary of candidate output tokens; and generating, as an output of the sequence generation task, a first token of a sequence by selecting a selected candidate output token from the vocabulary of candidate output tokens that has a highest score.

10. A system comprising:
one or more computers; and
one or more storage devices storing instructions that, when executed by the one or more computers, cause the one or more computers to perform operations comprising:

receiving, by the system, input data that describes an input of a first machine learning task;

receiving, by the system, first candidate output data that includes tokens representing each candidate classification output in a first plurality of candidate classification outputs of the first machine learning task for the input;

generating, by the system, an input sequence that includes the input and the first plurality of candidate classification outputs;

processing, by the system, the input sequence using an auto-regressive neural network to generate a network output that specifies a respective score for each candidate classification output in the first plurality of candidate classification outputs;

generating, by the system, a first output of the first machine learning task for the input, wherein generating the first output comprises using the respective scores specified by the network output generated by the auto-regressive neural network to select, as the first output, a selected candidate classification output from the first plurality of candidate classification outputs that are represented by the tokens included in the first candidate output data;

receiving, by the system, input data that describes another input of a second machine learning task;

receiving, by the system, second candidate output data that includes tokens representing each candidate classification output in a second plurality of candidate classification outputs of the second machine learning task for the other input, wherein the second plurality of candidate classification outputs comprise at least one different candidate classification output than the first plurality of candidate classification outputs;

generating, by the system, another input sequence that includes the other input and the second plurality of candidate classification outputs;

processing, by the system, the other input sequence using the auto-regressiveneural network to generate another network output that specifies a respective score for each candidate classification output in the second plurality of candidate classification outputs; and generating, by the system, a second output of the second machine learning task for the other input, wherein generating the second output comprises using the respective scores specified by the other network output generated by the auto-regressive neural network to select, as the second output, a selected candidate classification output from the second plurality of candidate classification outputs that are represented by the tokens included in the second candidate output data.

11. The system of claim 10, wherein the network output comprises a respective auto-regressive output for each candidate classification output in the first plurality of candidate classification outputs, and wherein each respective auto-regressive output comprises, at each of one or more output time steps, a respective score for each candidate output token in a vocabulary of candidate output tokens.

12. The of claim 11, wherein generating the first output of the machine learning task for the input comprises:
determining the respective score for each candidate classification output in the first plurality of candidate classification outputs from the auto-regressive output generated by the neural network for the candidate classification output.

13. The of claim 12, wherein selecting, as the first output, the selected candidate classification output comprises:
selecting, from the first plurality of candidate classification outputs, the selected candidate classification output for which a highest score has been determined from the respective auto-regressive output.

14. The of claim 10, wherein the input sequence comprises one or more first tokens that separate the input from the first plurality of candidate classification outputs.

15. The of claim 10, wherein the input sequence comprises one or more second tokens that separate each candidate classification output in the first plurality of candidate classification outputs from one another.

16. The of claim 10, wherein the first machine learning task and the second machine learning task are each a respective one of:
a natural language inference task, a sentiment task, a reading comprehension task, a commonsense reasoning task, a paraphrase task, a closed-book question answering task, or a coreference task.

17. The system of claim 10, wherein the auto-regressive-neural network is an attention-based neural network that has been pre-trained on unlabeled training data and subsequently fine-tuned on training inputs that each include a natural language description of an associated task.

18. One or more non-transitory computer-readable storage media storing instructions that when executed by one or more computers cause the one or more computers to perform operations comprising:
receiving, by the one or more computers, input data that describes an input of a first machine learning task;
receiving, by the one or more computers, first candidate output data that includes tokens representing each candidate classification output in a first plurality of candidate classification outputs of the first machine learning task for the input;
generating, by the one or more computers, an input sequence that includes the input and the first plurality of candidate classification outputs;
processing, by the one or more computers, the input sequence using an auto-regressive neural network to generate a network output that specifies a respective score for each candidate classification output in the first plurality of candidate classification outputs;
generating, by the one or more computers, a first output of the first machine learning task for the input, wherein generating the first output comprises using the respective scores specified by the network output generated by the auto-regressive neural network to select, as the first output, a selected candidate classification output from the first plurality of candidate classification outputs that are represented by the tokens included in the first candidate output data;
receiving, by the one or more computers, input data that describes another input of a second machine learning task;
receiving, by the one or more computers, second candidate output data that includes tokens representing each candidate classification output in a second plurality of candidate classification outputs of the second machine learning task for the other input, wherein the second plurality of candidate classification outputs comprise at least one different candidate classification output than the first plurality of candidate classification outputs;
generating, by the one or more computers, another input sequence that includes the other input and the second plurality of candidate classification outputs;
processing, by the one or more computers, the other input sequence using the auto-regressive neural network to generate another network output that specifies a respective score for each candidate classification output in the second plurality of candidate classification outputs; and
generating, by the one or more computers, a second output of the second machine learning task for the other input, wherein generating the second output comprises using the respective scores specified by the other network output generated by the auto-regressiveneural network to select, as the second output, a selected candidate classification output from the second plurality of candidate classification outputs that are represented by the tokens included in the second candidate output data.

19. The non-transitory computer-readable storage media of claim 18, wherein the first machine learning task and the second machine learning task are each a respective one of:
a natural language inference task, a sentiment task, a reading comprehension task, a commonsense reasoning task, a paraphrase task, a closed-book question answering task, or a coreference task.

20. The non-transitory computer-readable storage media of claim 18, wherein the auto-regressive neural network is an attention-based neural network that has been pre-trained on unlabeled training data and subsequently fine-tuned on training inputs that each include a natural language description of an associated task.

* * * * *